(12) United States Patent
Park (10) Patent No.: US 10,657,227 B2
(45) Date of Patent: *May 19, 2020

(54) STREAMLINED DIGITAL RIGHTS MANAGEMENT

(71) Applicant: Comcast Cable Communications, LLC, Philadelphia, PA (US)

(72) Inventor: Kyong Park, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/191,182

(22) Filed: Nov. 14, 2018

(65) Prior Publication Data

US 2019/0188360 A1    Jun. 20, 2019

Related U.S. Application Data

(63) Continuation of application No. 15/139,787, filed on Apr. 27, 2016, now Pat. No. 10,162,943.

(51) Int. Cl.
| | | |
|---|---|---|
| *H04L 29/06* | (2006.01) | |
| *G06F 21/10* | (2013.01) | |
| *H04L 9/08* | (2006.01) | |
| *H04L 29/08* | (2006.01) | |

(52) U.S. Cl.
CPC .......... *G06F 21/10* (2013.01); *G06F 21/105* (2013.01); *H04L 9/088* (2013.01); *H04L 63/0428* (2013.01); *H04L 63/08* (2013.01); *H04L 63/102* (2013.01); *H04L 67/306* (2013.01); *G06F 2221/0753* (2013.01); *H04L 2463/101* (2013.01)

(58) Field of Classification Search
CPC ....... G06F 21/10; G06F 21/105; H04L 63/08; H04L 63/0428; H04L 67/306; H04L 9/088; H04L 63/102
USPC .......................................................... 726/7
See application file for complete search history.

(56) References Cited

U.S. PATENT DOCUMENTS

| | | | |
|---|---|---|---|
| 7,653,943 B2 | 1/2010 | Evans et al. | |
| 7,711,647 B2 | 5/2010 | Gunaseelan et al. | |
| 8,819,848 B2 | 8/2014 | Moore | |
| 9,268,923 B2 | 2/2016 | Grab et al. | |
| 2014/0359709 A1* | 12/2014 | Nassar | H04L 63/08 726/4 |

(Continued)

*Primary Examiner* — Evans Desrosiers
(74) *Attorney, Agent, or Firm* — BakerHostetler (57) ABSTRACT

A streamlined workflow for digital rights management (DRM) licensing for content such as media assets is achieved via an authentication server establishing an authenticated session that is referenced by other processes, whereby a content grant may include a key to desired encrypted content with a portion of the content or content meta-data. The authentication server verifies the user's identity and provides a session grant including a session security mechanism, such as a token, session key, or negotiated secret. The session grant may be used to obtain a content authorization from a content router. The content authorization includes an address at which the content may be found and may be decorated with security mechanisms. The session grant and/or content authorization may include an entitlement record reflecting the user's entitlements to access content. The session grant and/or content authorization may be used to obtain a content grant from a content server.

20 Claims, 6 Drawing Sheets

(56) References Cited

U.S. PATENT DOCUMENTS

2015/0193601 A1    7/2015  Valjakka et al.
2016/0198202 A1*   7/2016  Van Brandenburg ........................
                                                          H04N 21/26258
                                                                  725/31

* cited by examiner

STREAMLINED DIGITAL RIGHTS MANAGEMENT

CROSS REFERENCE TO RELATED APPLICATIONS

This application is a continuation of U.S. patent application Ser. No. 15/139,787 filed Apr. 27, 2016, the contents of which are incorporated herein by reference in their entirety.

BACKGROUND

Digital rights management (DRM) is used to secure the distribution of digital content such as, for example, video and audio works. DRM provides a means to insure that only authorized persons or devices access particular digital content. In existing systems, digital content sometimes includes, or is associated with, meta-data. In an example scenario wherein a network provides access to video content, meta-data associated with the video content may be stored in a manifest that is associated with the video content. Client systems use the meta-data to determine which form of DRM protection, if any, is being used to secure access to a particular content item. In an example scenario, after using meta-data associated with content to resolve the form of DRM being used, a client system may contact a DRM server to negotiate a license for accessing the content. In connection with the negotiation, the DRM server provides a key with which the client may decrypt, descramble and/or otherwise gain access to the desired content.

Using existing methods of performing digital rights management, client systems are typically specially adapted to address DRM. For example, client devices may be required to have specialized DRM client software, firmware, or hardware. Moreover, content servers that are responsible for serving content in response to requests are also typically responsible for enforcing digital rights management. As a result, delivery of content that has been requested is frequently delayed while the content servers perform digital rights management functions related to request.

Accordingly, there is a need to improve the user's experience while meeting the requirements of secure content distribution.

SUMMARY

Applicant discloses systems and methods for improved digital rights management (DRM) licensing for digital content whereby an authentication server establishes an authenticated session. The authenticated session is employed by a client and referenced by other servers during subsequent processing to obtain digital content. In an example embodiment, a client device transmits separate requests to an authentication server, a content router, and a content server. The client first transmits a request to establish a session to an authentication server. The authentication server verifies the identity of the device, application, and/or user from which the request originated and returns a session grant which may be used in subsequent processing to access content. The session grant may further include entitlement information that specifies the user's authorization to access or receive particular content. For example, entitlement information may specify that a particular user or device is entitled to access a particular television channel, movie, program, etc. In an example scenario, the entitlement information may specify that the particular user, device, or application is entitled to access the HBO channel.

The session grant includes one or more security mechanisms that enable other devices or processes of a DRM system to recognize messages originating in a particular authentication session. For example, the session grant may include a session security mechanism, such as a token or a session key provided by the authentication server that is used by the client in subsequent communications to identify the session. The session key may include, for example, a message authorization code (MAC) generation key, an encryption key, or both. Further, the session grant may be signed using a key that is derived from a secret negotiated between the client and the authentication server, such as a Diffie-Hellman secret. The client then uses at least one session security mechanism of the session grant, e.g., a token, session key, or negotiated secret, to securely identify the session during subsequent communications with the authentication server, a content router, and/or a content server.

Next, the client uses the session grant to obtain a content authorization from a content router. The client device generates a request for authorization to access a particular media content item. In an example embodiment, the request comprises information specifying the desired content and information derived from the session grant. The information specifying the desired content may include, for example, a content identifier. The information derived from the session grant may include entitlement information. The information derived from the session grant may also include one or more security mechanisms of the session grant, such as a token, session key, or negotiated secret.

The request to access a particular media content item is transmitted by the client and received at the content router. The content router determines whether or not to authorize access to the data content identified in the request. In an example embodiment, the content router uses the session security mechanism information, e.g., a token, session key, or negotiated secret, to confirm that the session is authorized. The content router may examine entitlement information included in the request to determine whether the particular user, client device, and/or application is authorized to access the content identified in the request. Alternatively, the content router may perform an entitlement check upon receiving the request, whereby the content router checks a local or remote database to determine whether the request should be granted. Upon determining that the user or device associated with the session is authorized to access the requested content, the content server generates and transmits a content authorization message. In an example embodiment, the content authorization includes an address at which the content may be found, e.g., in the form of a signed uniform resource locator (URL). The content authorization may be secured using a security mechanism of the session grant, such as token, session key, or a negotiated secret.

Next, the client uses the session grant and/or content authorization to obtain a content grant from a content server. In an example embodiment, the client device generates a request to obtain content and forwards the request to the content server. The request may comprise information from both the session grant and the content authorization, whereby the content server may determine from the request itself that access is permissible. For example, in addition to specifying the particular content desired, the request to obtain content may incorporate the content authorization or a security header from the content authorization. Further, the request to obtain content may be secured using a security mechanism of the session grant, such as a token, a session key, or a negotiated secret. The request to obtain a content grant may incorporate entitlement information provided to the client by either the authentication server or the content router.

In response to the request to obtain content received from the client, the content server examines the security mechanisms of the request. If the request has been authorized by the authentication server and/or the content router, there is no need for the content server to independently assess the credentials of the user beyond examining the security mechanisms of the request to obtain a content grant. The content server may also examine entitlement information contained in the request to determine whether to provide a grant to the desired content. Alternatively the content server may independently assess whether the client is entitled to access the desired content, e.g., through examination of a local or remote database.

After confirming that the client is authorized to receive the requested content, the content server generates a content grant. The content grant includes information sufficient to enable the client to access the desired content. In an example scenario, the content grant may comprise a cryptographic key suitable for decrypting the requested encrypted content. For example, the key may be placed in the manifest of an item of digital video content, where it resides with, or substitutes for, standard DRM licensing meta-data. In an example embodiment, the content grant may further comprise the content or a portion thereof. The content server transmits the content grant to the client device.

The client device uses the content grant to access the requested content. For example, the client device may retrieve the requested content and use the key provided in the content grant to access the content. For example, the key may be a cryptographic key which the client uses to decrypt encrypted content. Alternatively, the key may be used to unlock a hardware or software feature of a playback device with which the user is able to play the content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION

Digital rights management (DRM) is used to secure the distribution of digital media content assets such as videos. In systems that employ DRM, digital content items are typically stored in an encrypted format. For example, symmetrical encryption algorithms using a secret key may be used to encrypt digital content items. Typically, the key used to encrypt a data item is not personal to any particular user, and any user can download the encrypted asset, even anonymously.

In order for a client device to play an encrypted data item, the data item must be decrypted. The client device typically must access a DRM server to obtain permission, e.g., a license, and/or a key or other means to access the content. In existing systems, the client device comprises DRM client software for interfacing with a DRM server. Typically, the DRM server, or an adjunct server, may require that the client device be authenticated. The DRM server may also perform one or more entitlement checks. For example, the DRM server may check that the user has a current valid subscription to access the requested content asset, or has recently paid for access to a particular asset. Upon satisfaction of the entitlement checks, the DRM may provide the key to the client device. The client device may then use the key to decrypt or descramble and use the media.

Existing methods of DRM workflow are especially suited to perform business context integration and rights configuration control at the end of processing for providing access to digital content. For example, after acquiring media that is protected by DRM, a client device may then discover the form of DRM protection. In an example scenario, a client device may determine that the media has DRM meta-data embedded with the media or associated with the media. The client device may thereafter request to acquire a DRM license from a DRM server. In connection with processing those requests, the DRM server may invoke various entitlement checks and/or business rules to determine whether the user is permitted to access the content. A workflow of this type works for a mixture of protected and unprotected media. The browsing and download procedures may be the same for both DRM protected content and unprotected content.

Accordingly, existing DRM processing typically relies upon several processing steps occurring sequentially after the desired media has been selected and/or acquired. The time required to discover the protection mechanism, request the license, perform entitlement and other checks, and provide the key are frequently experienced by the user as delay in, for example, the start of play of a requested media asset. For instance, it may mean a lag between the selection of a streaming television channel, or video-on-demand (VOD) program, and the beginning of viewing. Delays of six to twelve seconds are not unusual. Even a delay of a few seconds may be frustrating to a user.

One strategy that has been proposed to address delays in processing resulting from DRM resolution is optimistic DRM license acquisition. Optimistic license acquisition typically involves the client device or system fetching DRM licenses based on the proximity of a user's browsing to a title. For example, a user may have drilled into the description for a movie on a web site, but not as yet requested to play movie. In response to the action of the user requesting a description of the content, the client system optimistically fetches a DRM license in advance of a play request. Such an approach is often inefficient since the majority of DRM licenses acquired in this way are ultimately discarded without being used because the client device never requests the data content associated with the license that was optimistically acquired.

Applicant discloses herein improved methods for providing digital rights management. Systems for content delivery are often predicated on authenticated client access. For example, in many content delivery systems, before a client device or system may access content on a system, the client must first be identified and verified by the system. In an authenticated and entitlement-driven environment, such as content consumption in a cable distribution infrastructure, all clients are pre-disposed with an identity. That is, user-driven sessions are typically initiated with a client-hosted identity. That identity permits clients to be identified on all service interactions, such as, but not limited to, the acquisition of content catalogs, media, and DRM licenses. According to an aspect of the processing disclosed herein, the authentication of the client device and/or user of the device allows for an abridged DRM workflow, whereby DRM license logic and artifacts may be integrated into operations of a content delivery system at numerous points in the processing including prior to the delivery of the content. For example, DRM license processing may be integrated into processing relating to client authorization and content routing as well as processing of content delivery.

A content delivery system may be made up of multiple component responsibilities. For example, content delivery responsibilities may include media request acceptance, media protection, media publishing, media caching, and media delivery to the client. Content delivery processing may further include user authentication, user entitlements checking, and content routing.

Content delivery functions or responsibilities may be implemented using various different computing configurations. For example, a content delivery system may be implemented as a single, monolithic server on which all of the responsibilities are implemented. Alternatively, the responsibilities may be distributed among multiple component servers and/or subsystems. For example, a content router acting as a media director may accept media requests, but then redirect the client to a preferred delivery location, such as a content server. Similarly, such a content router may redirect the client to an origin packager that is responsible for protection and publishing content, or to a content delivery network (CDN) that is responsible for caching and delivering content to the client.

According to an aspect of the disclosed embodiments, DRM licensing logic and artifacts are integrated at appropriate locations in the operations and communications of the media delivery system. In an example embodiment, the content delivery system may first obligate clients to authenticate with an authentication server. The content delivery system thereby acquires the client's customer-oriented identity by challenging the identity of the client. For example, the authentication process may provide the authentication server with the client's DRM credentials such as a DRM device identity, business identities such as subscriber account ID, and/or specific business-related media entitlements. Furthermore, the authentication process itself may incorporate the negotiation of cryptographic materials, such as keys for use in a key transport protocol used for subsequent license delivery.

In an example embodiment, during authentication processing, the system also resolves the user's current "entitlements," e.g., which media the client has rights to play. In an example configuration, the authentication server itself resolves entitlements. In an alternative embodiment, an entitlements server acquires such context information via an in-band authentication method, for example, or via reliance on a client identifier which is then leveraged against a back office service. A client-specific DRM license may then be prepared in accordance with the user's entitlements. The license may be generic to the user's entitlements, or reflect a specific media asset identified by the client. The DRM license may be protected using cryptographic artifacts negotiated with the client during authentication.

The DRM license may take a number of forms and be used in a number of ways. For example, the license, in the form of an entitlements record may be provided to the client by the authentication server or entitlements server.

In an example embodiment, the client device formats and transmits a request including the licensing information to a content router server. The content router acquires context information regarding the client session via an in-band authentication method or client identifier leveraged against a back office service. Upon acceptance of the session and the entitlements, the content router generates and transmits to the client device a content authorization encompassing routing information and/or additional DRM licensing data.

The client device generates and transmits a request to a content server that encompasses client credentials and session credentials, and may include DRM license information, an entitlement record, and/or a content authorization. The content server acquires context information regarding the client session via an in-band authentication method or client identifier leveraged against a back office service. For example, the content server may check the entitlement of the client to access the requested content by contacting the entitlement server. The processes of authentication and entitlement checking are separate so that delays typically associated with authentication, such as those resulting from communications with a credential authority to verify a certificate proffered by a client, are not experienced each time a client seeks content.

Upon acceptance of the proffered credentials, the content server may provide DRM license information to the client device in a number of ways. For example, the content server may embed a DRM license and/or keys in the content meta-data, which may then be downloaded by the client device.

Notably, the client does not need to interact with a separate license server prior to extracting the content encryption key, initializing its decryption process, and initiating play of requested media. At the time that specific content is selected and requested from the content server, the user's rights, entitlements, and license have been pre-negotiated. Accordingly, the response from the content server is not delayed by additional processing relating to license verification.

Figure 1:
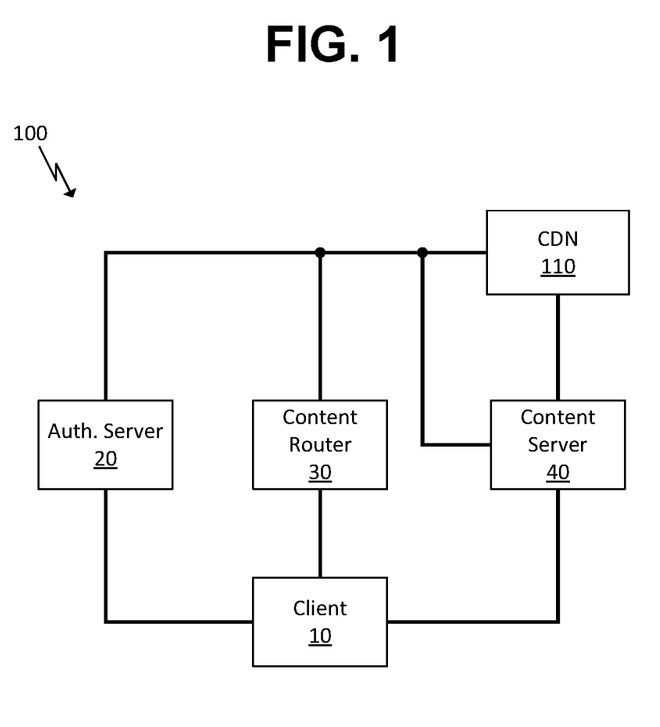
FIG. 1 is a block diagram of an example content distribution system.

FIG. 1 is a block diagram of an example of a content delivery system 100. At the bottom of FIG. 1 is client 10, which is in communication with an authentication server 20, a content router 30, and a content server 40. The authentication server 20, content router 30 and the content server 40 are in communication with each other and in communication with a content delivery network (CDN) 110.

The client 10 may be any digital device or virtual machine which allows a user to obtain and/or use digital content such as data, audio, video, picture, and/or other content and related data. The content may, for example, be media data in raw or compressed formats, and may carry one or more forms of meta-data, such as video manifests and the like. The client 10 may take the form of: a computer such as a desktop, server, laptop, or tablet device; a hand-held mobile device such as a telephone, personal digital assistant, or other mobile computing terminal; or media device such as a gaming system, digital video recorder (DVR), television, or set-top cable or satellite receiver box. The client 10 may be a process operating on such a device, such a cellular telephone software application (app) or a function embedded in an HTTP web page, for example, or a function of a DVR.

The client 10 may be connected to the authentication server 20, content router 30, and content server 40 on a single network or via two or more communication pathways. For example, the client 10 may connect to the servers via terrestrial wireless, coaxial, fiber-optic, or satellite link channels. Such connections may be made over private networks such as a cable distribution network, a wireless phone network, the Internet, or any combination thereof. These may encompass any suitable networking links including, for example, microwave, satellite, optical fiber, coaxial, plain old telephone line (POTS) connections, cellular, and RF wireless linkages, alone or in combination, for one-way and/or two-way links for content in a variety of formats. Similarly, the content router 30 and content server 40 may be connected to the CDN 110 via any conventional means.

The authentication server 20, content router 30, and content server 40 may be virtual machines residing on a single physical server computer, for example, or may reside on two more physical computers that are collocated within a single facility. However, for efficiency reasons, in a large content distribution system, it may be preferable to position the servers at two or more separate facilities.

Communications between the client 10 and the authentication server 20, content router 30, and content server 40 may be secured in a number of ways. For example, the client 10 may provide encrypt initial communications with authentication server 20, and/or provide a security certificate to the authentication server 20. In establishing an authentication session with the client 10, the authentication server 20 may provide the client 10 with a security token and/or a session key. The session key may include, for example, a message authorization code (MAC) generation key, an encryption key, or both. Further, the authentication server 20 may negotiate a security secret with the client 10, e.g., via Diffie-Hellman key exchange. Thereafter, the client 10 may use such a security token, session key, or negotiated secret to secure private or non-private communications with the authentication server 20, content router 30, and/or content server 40 for the duration of the session.

The CDN 110 may provide content from a central source such as a head end, and feed transmissions, such as linear and time-shifted media, on-demand media, data content, etc., down to the content server 40. The CDN 110 and the content server 40 may comprise any suitable networking devices, systems, and sub-networks for routing content data. They may comprise, for example, a variety of digital and/or analog buffers, multiplexers, caches, routers, repeaters, amplifiers, encoders, decoders and the like. They may be connected to each other, to the authentication server 10, content router 20, and the client 10 via network connections that may encompass any suitable networking links. The content server 40 may have a separate connection to the CDN 110 and to client 10 that allow higher bandwidth than, for example, communication between the client 10 and the authentication server 20 or content router 30. In the case of coaxial or fiber connections, for example, the content may be delivered to the content server 40 or the client 10 as quadrature amplitude modulated (QAM) digital data transmissions.

In an example embodiment the content router 30 and content server 40 are generic systems, rather than encompassing specialized hardware or software to implement security mechanisms. In such an embodiment, router 30 and server 40 do not require special hardware or software to perform non-standard security procedures. Router 30 and server 40 are not burdened with the performance of computationally intensive security procedures. In such an embodiment, router 30 and server 40 may use standard security protocols, and require little or no customization to perform the operations described herein.

Figure 2:
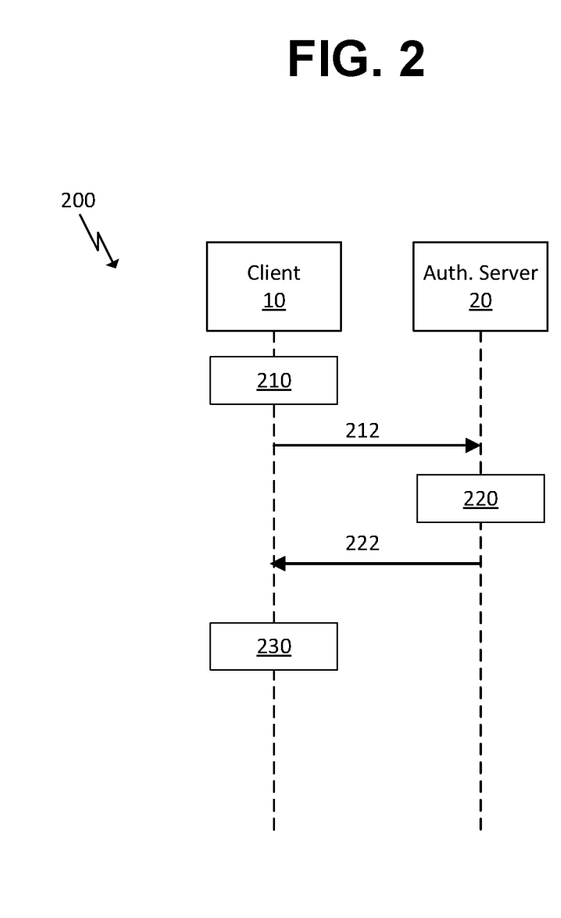
FIG. 2 is a message flow diagram of an example process for obtaining a secure session by which content may be accessed.

FIG. 2 is a message flow diagram of an example process 200 for authenticating a session. The client 10 and authentication server 20 may be in communication, for example, as shown in FIG. 1. Here in FIG. 2, the client 10 composes an authorization request in a process 210, and sends the authorization request as message 212. The authorization request 212 includes one or more client credentials. The credentials may include, for instance, a client private key or private key signature, a username, password, security certificate, another authentication factor, or some combination thereof.

The authentication server 20 receives the authorization request 212 and evaluates it in a process 220. In the process 220, the authentication server may authenticate the client device 10 by, for example, examination of an internal database or by querying another server such as a certificate authority. In addition, or alternatively, the authentication server may prompt the user of the client device 10 to provide an additional credential such as, for example, a username and password, or other authentication factor such as a code texted to a cellular telephone of the user of the client device 10.

The process 220 may also involve a check of the entitlements of the user, whereby the authentication server 20 or an entitlement server (not shown) reviews the status of the user's account, subscription, purchase status, or the like, to determine which content the client device 10 is entitled to access. The content which the client device 10 is entitled to access, and/or the content the user is not entitled to access, may be encapsulated in an entitlement record. For example, the authentication server or entitlement server may check a local or remote database regarding a billing or subscription status, or a recent asset purchase associated with the account of the user of the client device. The entitlement may reflect a specific requested content item, e.g., an item specified in the authentication request 212 or specified in a request pending at the time the authentication request 212 was received. Alternatively, the entitlement could reflect the rights of the user generally, and be used in reference to a request that the client device transmits at a later time. Thus, in the case of cable television service, the entitlement record could show that the client device is entitled to access all HBO programming and a certain pay-per-view live broadcast event. Alternatively, again in the example of a cable system, the entitlement record could reflect all the channels which the client device is entitled to access. Such a broad entitlement record may impact system efficiency, in as much as neither authentication nor entitlement checks would be necessary later in the same client session, regardless of the number of future requests made by the client for specific content.

In the example depicted in FIG. 2, the authorization request is successful, and the authentication server 20 responds to the client 10 with a session grant message 222.

Message 222 may contain an entitlement record. The session grant includes a security mechanism whereby the client 10 may identify the authenticated session. The security mechanism may be, for example, a security token, a session key, or a secret negotiated between the authentication server 20 and the client 10. The session key may include, for example, a message authorization code (MAC) generation key, an encryption key, or both. For example, session grant message 222 may include such a token or session key, or be signed with a key derived from a negotiated Diffie-Hellman secret.

The negotiation by which a session grant is created may include, or result in, configuration of the security of the session at various security tiers, such as bearer token, token plus keyed authentication, token plus keyed authentication and privacy. The session may be configured with varying key sets depending on desired security primitives, such as authentication, authentication and encryption, etc. Thus the outcome of the session grant process may include, for example: (a) a token; (b) a token together with an authentication key such as a MAC generation key; (c) a token, an authentication key such as a MAC generation key, and an encryption key; and (d) a token and a dual authentication and encryption key such as a CMAC (Cipher-based Message Authentication Code) key.

In a process 230, the client 10 stores the session grant and/or information derived from the session grant such as the security mechanism. The security mechanism may be used by the client 10 not just for subsequent communications with the authentication server 20, but also with the routing server 30 and content server 40, as will be described below, e.g., in reference to FIGS. 3 and 4. Further, the security mechanism may optionally be a temporary credential. It may be conditioned, for example, on a duration limit or a condition. For instance, the session key, token, or secret may expire in twenty four hours. The client 10 may use the security mechanism within that time without having to repeat the authentication process. Alternatively, the security mechanism may expire upon an event such as the loss of connection. For example, the client 10 may be running on a cable television set top box, and the session may be considered valid after authentication so long as contact is not lost between the cable provider and the set top box. If communication is lost, authentication may be required before services are again provided.

Figure 3:
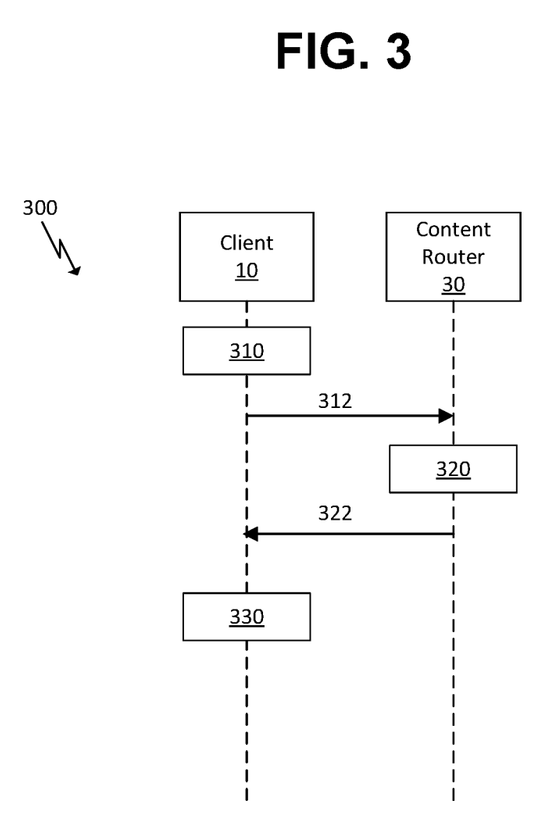
FIG. 3 is a message flow diagram of an example process for obtaining routing information and other data related to requested content.

FIG. 3 is a message flow diagram of an example process 300 for obtaining routing information for requested content. The routing message flow 300 may take place subsequent to an authentication message flow such as message flow 200 of FIG. 2. The process 300 may occur in-band, i.e., in the context of the same session as depicted in process 200 of FIG. 2.

Referring to FIG. 3, in a process 310, the client 10 composes a routing request, which it then sends as a message 312. The routing request 312 includes a content ID which identifies a particular content item to which the client 10 seeks access. The routing request 312 uses the security mechanism established with the authentication server. The message 312 may optionally incorporate an entitlement record.

The routing request 312 is received by the authentication server 20. The authentication server 20 evaluates the request 312 in a process 320. In process 320, the content router 30 server checks the credentials of the client 10 by examination of security mechanism used in request 312. The content router may also check the entitlements of the account associated with the client device 10 to determine whether to provide service. The content router 30 may do so, for example, by checking an entitlement record provided with the request 312, by reference to a local database, or through communications with an entitlement server, not shown. The content router 30 may also check for the best source of the content based on the address of the client 10. For example, to avoid hops, the content router 30 may select the URL of a source of content matching the content ID that is geographically near the client 10.

The use of a session security mechanism enables the content router 30 to bypass authentication of the client device per se. As long as the client device session has not expired, the token, session key, or negotiated secret serves to show that the client device is legitimately allowed to request routing information. If the session has expired, or the session mechanism is otherwise invalid, the content router 30 may refuse the routing request 312 and/or refer the client 10 back to the authentication server 20 to initiate authentication. Similarly, an entitlement record may be used to bypass an entitlement check being performed at this stage in the process. Alternatively, if the credentials or entitlements have expired or are otherwise inadequate, the content router 30 may refuse the routing request 312 and/or perform its own entitlement check or refer the client 10 back to the authentication server 20 or an entitlement server to initiate a new entitlement check.

In the example scenario depicted in FIG. 3, the routing request 312 is successful, and the content router 30 responds to the client 10 with a content authorization message 322. Message 322 may include a content identifier and/or a client identifier. Message 322 may use the session security mechanism, e.g., it may include a token or a session key provided with the session grant, or include an indicia of a shared secret negotiated during the session grant process. The content authorization 322 may include a signed URL, i.e., a uniform resource locator (URL) containing information, in addition to the resource location, to be used by the resource host to determine whether and how to release the resource to the requestor. In this case, the additional information may be secure meta-data related to the identity of the client device and/or one or more entitlements of the account of the user associated with the client device. Such a content authorization may be used by, e.g., the content server 40 and/or the CDN 110, to authenticate the client device, as will be described in further detail below in reference to FIG. 4. In a process 330, the client 10 stores the content authorization, and/or information derived therefrom.

Note that the content router 40 does not have to be a router per se. Any system that can point the client 10 to the best location to obtain a copy of a requested content will suffice. Preferably, however, rather than just publishing a URL, the content router 30 may take advantage of the session security mechanism to do two things. First, the content router may invoke cryptographic algorithm and/or security challenges to confirm the identity and entitlements of the client 10. Second, the content router 30 may encode the location information provided to the client 10 in such a way that the location information is decorated with the security information specific to the client 10. This may involve secrets shared between the content router 30 and the content server 40, for example, that are not shared with the client, i.e., in addition to the session security mechanism. For example, the location information may be provided in a signed URL, e.g., a URL that includes a security header with opaque security information. The URL may also be encoded in a way that reflects a negotiated secret, e.g., a Diffie-Hellman secret, shared by the router 30 and the client 10.

Notably, entitlement checks could be performed by the content router 30 rather than the authentication server 20. This may be preferred if entitlements are highly dynamic, but not preferred when entitlements are relatively static.

Figure 4:
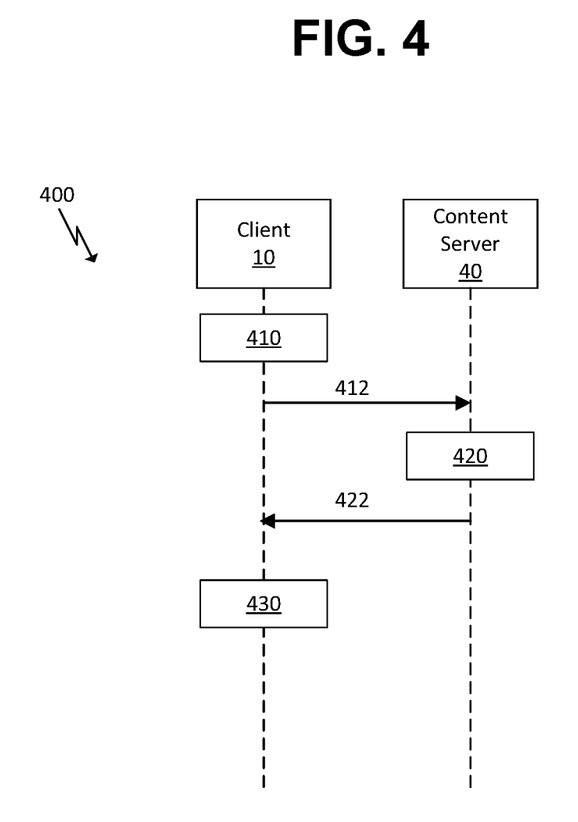
FIG. 4 is a message flow diagram of an example process for obtaining content and/or related meta-data or keys.

FIG. 4 is a message flow diagram of an example process 400 for obtaining content. The process 400 may occur in-band as part of the same client session as process 200 of FIG. 2 and process 300 of FIG. 3. The client 10 and content server 40 may be in communication with each other, and the content server may further be in communication with the CDN 110, for example, as shown in FIG. 1.

Referring to FIG. 4, the client 10 composes a content request in a process 410, and sends the content request as message 412. The content request 412 uses the session security mechanism. The message 412 may include a content authorization such as a signed URL, session grant, and/or an entitlement record.

The content request 412 is received by the content server 40, which evaluates the request 412 in a process 420. In the process 420, the content server 40 may decide to refuse the request if, for example, there is an issue with the session key and/or content authorization presented. Alternatively, the content server 40 may decide to grant the request immediately if the content is immediately available from the content server. Further, the content server may contact the CDN for assistance in fulfilling the request. Note that the CDN may also take advantage of security mechanisms of the content request 412 to avoid doing additional checks for whether the client 10 is entitled to access to a particular content asset.

In process 420 the content server 40 may check the entitlement to access the requested content in a number of ways. For example, an entitlement record may be included in the request 412. Alternatively, the content server 40 may perform an entitlement check by reference to a local database or through communications with an entitlement server, not shown.

In the example depicted in FIG. 4, the request is granted. In the process 420, the content server formulates a response, which the content server 40 sends to the client 10 as message 422. Message 422 may include information necessary for the use of the requested content. For example, message 422 may include a license and/or a key for accessing the content. In an example scenario, the key may be a decryption key. The license and/or key may be provided along with meta-data associated with the content. The license and/or key may also be embedded in the meta-data. For instance, if the requested content is an MPEG video, rather than merely including DRM type information in the manifest of the video, the content server 40 may include the DRM license and/or the key to decrypt or descramble the video directly in the manifest of the video. In addition, the content encryption, the license, and/or the key may be targeted to the specific client 10 device, e.g., tied into the serial number of a processor of the client 10 device, such that only the targeted device can used the license and/or key to decrypt the content.

It will be appreciated that the content license and/or key may be in place of standard DRM type meta-data. Notably, the size of DRM meta-data may be large, e.g., on the order of 7-12 kB, and the time needed to generate such information may add additional delay to the beginning of play of media files. For instance, such information may have to be tailored to the type of content requested and the platform on which the user seeks to access the content. Hence, by avoiding the inclusion of DRM type meta-data by instead including a license or key in the download to the client 10, the delay of creating such DRM type meta-data may be avoided.

In a process 430, the client 10 processes message 422. For example, the client may have previously downloaded content such as a media asset, or a portion thereof, and then use a key provided in message 422 to initiate decryption and playing of the media in the process 430. Alternatively, for example, along with message 422, the content server 40 may start providing the client 10 with a stream of the requested content. In contrast to process 220 of FIG. 2, in process 420 of FIG. 4, content server 40 does not need to authenticate the client device 10 by, for example, examining an internal database, referencing another server, or prompting the user of the client 10 to provide an additional credential such as a username and password. The content server 40 does not have to check the entitlements of the user because processing related to entitlements has already been performed by the authentication server 20 and/or the content router 30. The product of that work has been made available to the content server 40 in the form of the session security mechanism and/or the content authorization. To perform its function, the content router 40 need only examine the session security mechanism and content authorization as reflected in message 412 as proffered by the client 10.

Subsequent to receiving the content and upon receiving message 422, the client 10 is able to access the received content immediately. It may do so without initiating an analysis of the content to determine which DRM protections may apply, and without then seeking a license based on that analysis.

The disclosed methods reduce the security processing burden upon the content server 40. For example, if the content authorization includes a signed URL, the signature of the URL may be verified in a generic way that is not necessarily bound to the client authentication method as used, e.g., in process 200 of FIG. 2. Nor is the content server 40 burdened, for example, with unraveling business tokens or executing complicated authenticated protocols.

Reducing the security processing burden on the content server 40 speeds the process of getting the license and/or key to the client 10 in a number of ways. First, to the extent possible, the time necessary to authenticate the client 10 and check entitlements has been moved to beginning of the client device session, rather than occurring at the time that access to the media is request. Second, the use of the session security mechanism, for example, and of other signed messages such as a signed URL, eliminates or speeds security procedures occurring at the time that access to a content item is request. Third, as noted above, at the time that access is requested, there is no need to create and/or decipher and process DRM meta-data associated with a content item.

Processing may be further improved by communicating security data between the authentication server 20, the content router 30, and/or the content server 40. This may occur instead of, or in addition to, communications with the client. For example, the content router 30 may send a signed URL content authorization directly to the content router 40, and thereby remove processing delay associated with communicating the content authorization down to the client 10 and back up to the content server 40. Similarly, if the authentication server 20 is aware of a pending content request from the client 10, it may pass the session grant directly to the content router 30. Alternatively, if the authentication server 20 is collocated with the content router 30, or possesses features similar to those of the content router 30, then the authentication server may 20 arrange for a content authorization to be sent to the content server 40 at the time a decision is made to provide a session grant. This may allow the content server 40 to prepare content for the client 10 even before client 10 presents a request to the content server 40 to initiate download of content and/or decryption materials.

Process 430 may implement content delivery policies. The authentication server 20, content router 30, and/or content server 40 may contain data identifying the characteristics of the platform on which client 10 is operating including any software restrictions that are enforced by client 10. For example, different video content resolution restrictions may be placed on different client platforms. With foreknowledge that the client 10 will conform a given policy, the content server 40 may safely store and deliver a single encrypted content file to multiple platforms and trust that the client 10 will limit resolution according to the policy. Similarly, once authenticated, the client 10 may be trusted to implement other policies, such as an ad-insertion policy, during the playback of request media content. Alternatively, contrary to tradition in DRM systems, the client 10 may not be a device that is expected to enforce policies preferred by the content provider. For example, the client 10 may be an unregistered or otherwise unknown device that is capable of receiving and decrypting content, but is otherwise unaffiliated with the content provider and not compliant with the policies of the content provider.

In a small content delivery system it may not be necessary to have a content router. In such a case, a session grant may be tailored to serve the same purpose as a content authorization. The client 10 may then compose a content request to the content server 40 in such a way that the content server 40 may quickly process the security mechanisms of the content request and respond as in process 400. However, in large deployments, such as national deployments, it will likely be useful to have the ability to distribute the functionality of the authentication server 20, content router 30, and content server 40 in a variety of ways, including in a number of physical or virtual embodiments.

Figure 5:
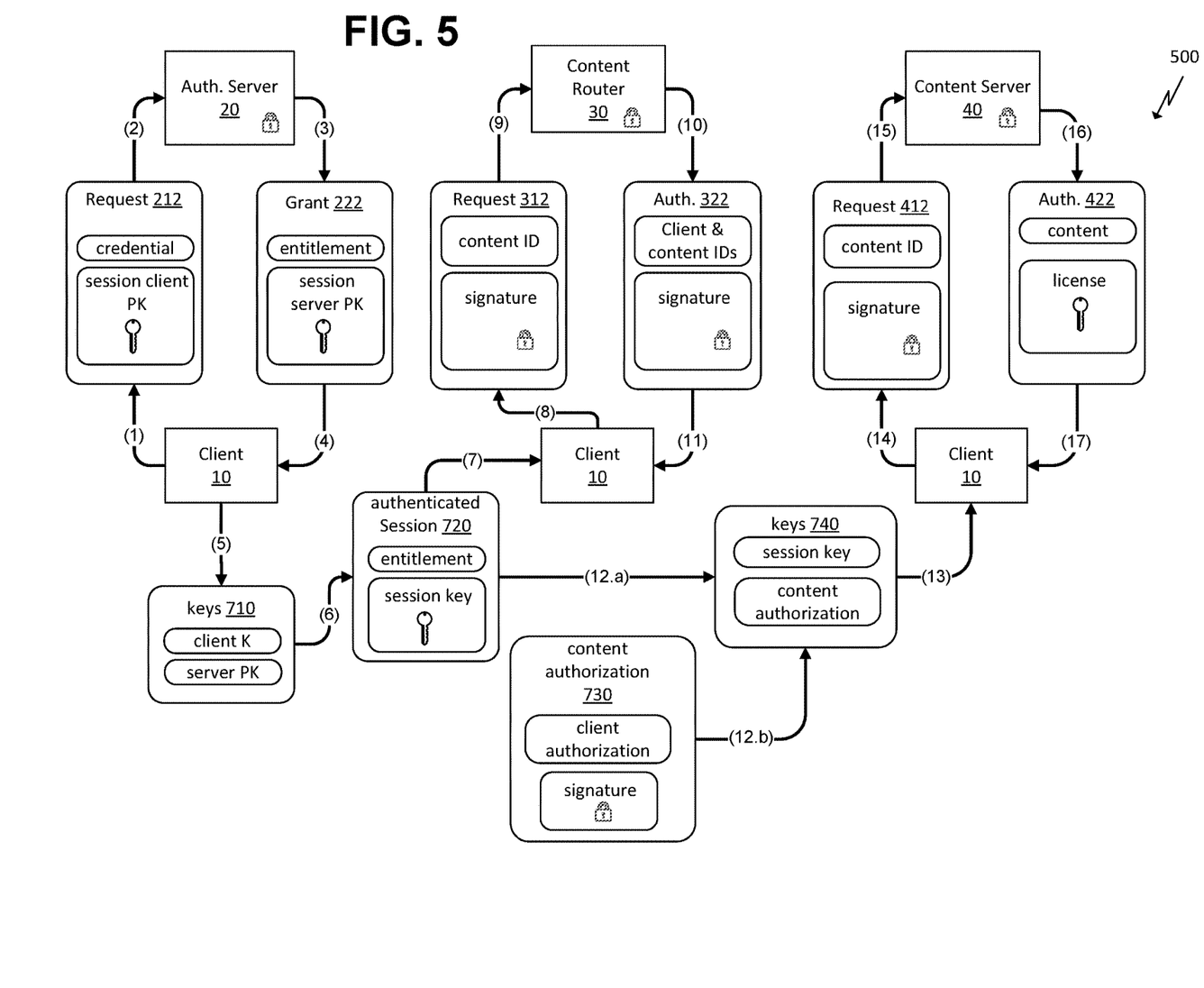
FIG. 5 is a view of objects involved in an example of a method of implementing the techniques described in connection with FIGS. 2-4.

FIG. 5 depicts processing implementing the techniques described in connection with FIGS. 2-4. In the embodiment of FIG. 5, both devices and data objects are depicted in the processing. The authentication server 20, content router 30, and content server 40 are shown along the top portion of the figure. Steps are indicated with arrows marked with numbers in parentheses. The client 10 is shown three times, once in its interactions with each of the authentication server 20, content router 30, and content server 40.

In step 1, the client 10 sends a request 212 which includes a credential and a session client private key. Request 212 arrives at the authentication server in step 2. In step 3, the authentication server responds with a session grant 222 which includes client entitlement information and a session server private key. In step 4, grant 222 arrives back at the client 10. In step 5, the client forms a key record 710 which includes a client key and a server private key. In step 6, the client uses the key record 710 to create an authenticated session 720, which includes the entitlement information and a session key.

In step 7, the client 10 draws upon the authenticated session 720 to form a request 312 which it sends in step 8. Request 312 includes a content ID and a signature. In step 9, the content router receives request 312. In step 10, the content router 30 sends an authorization 322 which includes client and content IDs along with a signature, which the client 10 receives in step 11. The client 10 then stores a content authorization 730 which includes a client authorization and a signature. Not shown, this information may be added to the authenticated session object 720.

In steps 12.a, 12.b, and 13, the client 10 draws upon the authentication session information 720 and the content authorization 730 to create key information 740. The key information 740 includes a content authorization. In step 14, the client 10 sends a content request 412, which includes content ID and a signature. The request 412 arrives at a content server 40 in step 15. In step 16 the content server 40 sends an authorization 422. The authorization 422, which in this example includes both content and a license to use the content.

Figure 6:
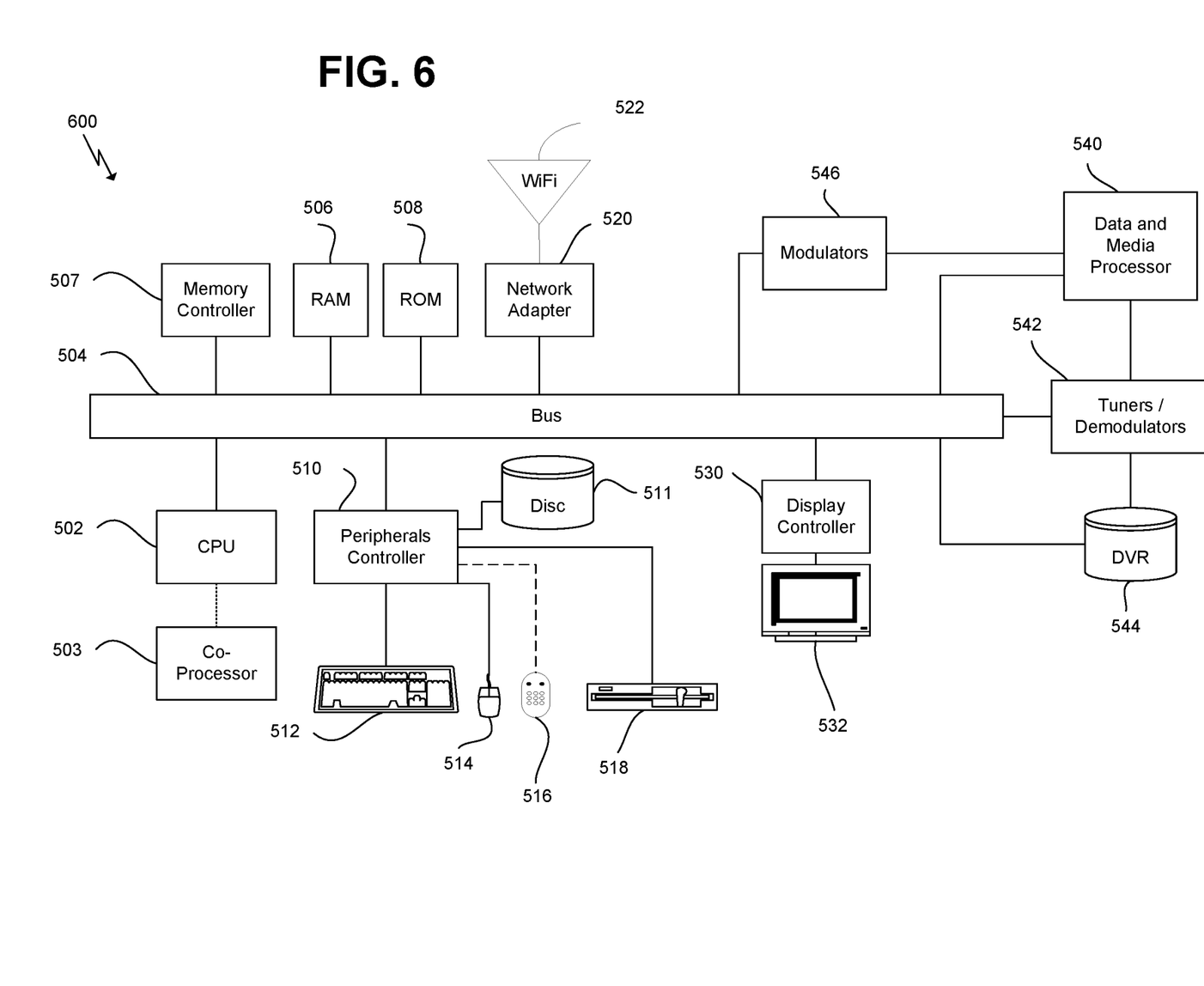
FIG. 6 is a block diagram of an example stationary user system or network device.

FIG. 6 depicts an example of a stationary or mobile user system 500 for obtaining, processing, and displaying data such as media content. The system 500 may be an integrated device, but is more commonly implemented as a combination of devices. For example, a stationary system could consist of a gaming console connected to a handheld controller and a computer display. Alternatively a stationary system could be a television with a remote connected to a set-top box or router, or a personal computer system connected to a cable modem. The example system 500 of FIG. 6, is depicted as including a central processing unit 502 which is connected via a bus 504 to various standard computer elements such as a RAM 506 and a ROM 508 memory, a network adapter 520, a peripherals controller 510, a mass storage device 511 such as a disc or RAM drive, and an audio/graphics display controller 530. The CPU 502 may be implemented in any number of ways, such as in conjunction with a math, video, audio, or media coprocessor 503. The CPU 502 may be a traditional von Neumann architecture general purpose CPU executing instruction code sequences stored in the RAM 506, the ROM 508, and/or the mass storage unit 511, or it may be a programmed hardware device such as an application-specific integrated circuit (ASIC) or field-programmable gate array (FPGA.)

In addition to managing the mass storage device 511, the peripherals controller 510 is depicted as managing user interface features such as visual and audio indicators as LEDs, speakers, etc., or other indicators (not shown), such input devices as a keyboard or keypad 512, a trackball or mouse 514, and a remote control 516. Often such a system today includes a separate memory controller 507, a removable media drive 518, and a wireless adapter such as a WiFi transceiver 522.

The network adapter 520 allows the system 500 to connect to Internet protocol networks. As depicted in FIG. 6, the system 500 has certain CDN network connection features connected directly to the bus 504. The CDN connection features include a data and media processor 540, which may comprise a cable modem complying with the Data Over Cable Service Interface Specification (DOC SIS) standard. This data and media processor 540 may incorporate or be connected to one or more quadrature amplitude modulation (QAM) tuners and demodulators 542. The demodulators 542 may feed content either to the system bus 504 and/or directly to a digital video recorder (DVR) 544, for instance. The data and media processor 540 may receive instructions directly from the remote control 516 via a wireless link, such as an infrared optical or RF link, or indirectly via the peripherals controller 510 and the bus 504 in accordance with operations of the CPU 502. The system 500 is shown with an optional modulator 546 which may be used to encode and/or modulate data or media content for transmission via the data and media processor 540 to nodes on the CDN or peer devices on the same network leg as system 500.

The linkage between the display controller 530 and the display 532 may be of any kind. For example, it may be an HDMI, VGA, RGB, or equivalent video link.

The system 500 may be adapted to perform the processes described herein via software stored in the RAM 506, the ROM 508, or the mass storage 511, or via hardware programming of the CPU 502. For example, system 500 may be specially adapted to perform the methods described herein in reference to FIGS. 2-4 pertaining to management DRM licensing for content distribution such as securely establishing a session, obtaining a content authorization, and obtaining content and related keys and/or licenses. The system 500 may incorporate GPS or other location tracking features, not shown in FIG. 5.

It will be appreciated that while illustrative embodiments have been disclosed, the scope of potential embodiments is not limited to those explicitly described. For example, while the concepts are described with reference to particular user interfaces, the envisioned embodiments extend to any user interfaces that may be suitable for performing the described linking functions. Likewise, while particular content distribution technologies as DOCSIS, quadrature amplitude modulation (QAM), and IP protocol packet networking are referred to, any content distribution technologies may be used and still fall within the scope of envisioned embodiments.

Information sought by users may take a variety of forms. For simplicity, herein the terms "content" and "media" are used interchangeably to refer to all forms of data, whether transmitted in analog, digital, or mixed-media formats, and whether experienced by the user as audio, static images, motion pictures, text, graphics, software, or other data. Similarly, the terms "keys" and "licenses" may refer to digital codes, instructions, methods, or permissions to decode, decrypt, or descramble content, or to otherwise allow a user to access the content.

DRM may be employed on any content delivery network, such as television networks, internet service provider networks, cellular communication networks, and the like. Such networks may deliver data and media content in a variety of formats via a variety of technologies, such as quadrature amplitude modulated signals and internet protocol digital packets delivered via coaxial cable and/or optical fiber, twisted pair, wireless, or other pathways. Devices for obtaining, viewing, and/or using content may similarly take a variety of forms, including, for example, smart phones, tablet computers, gaming consoles, cable television set-top boxes, to name but a few.

Each of the processes, methods, and algorithms described in the preceding sections may be embodied in, and fully or partially automated by, code modules executed by one or more computers or computer processors. The code modules may be stored on any type of computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventive concepts disclosed herein. The accompanying claims and their equivalents are intended to cover such forms or modifications as would fall within the scope and spirit of certain of the inventions disclosed herein.

What is claimed:

1. A method, comprising:
   pre-negotiating, between a content server and a license server, a license, the license pertaining to a media content;
   receiving, by an authentication server from a client, a request to establish a session, the request to establish a session specifying a user account;
   authenticating, by the authentication server, the client based on information relating to the user account;
   establishing, between the authentication server and the client, a session, the session having a session security mechanism;
   transmitting, by the authentication server to the client, a response to the request to establish a session, the response to the request to establish a session comprising a first indication of the session security mechanism;
   receiving, at the content server from the client, a request to access the media content, the request to access the media content comprising a second indication of the session security mechanism;
   determining, by the content server based at least in part upon the second indication of the session security mechanism, to grant access to the media content; and
   providing, by the content server to the client, a content grant comprising a content key, the content key being embedded in a manifest associated with the media content, wherein the content key is consistent with the license.

2. The method of claim 1, wherein determining to grant access to the media content comprises determining entitlements, the entitlements being associated with the user account and pertaining to accessing media.

3. The method of claim 1, wherein:
   the response to the request to establish the session comprises entitlements for accessing media associated with the user account; and
   the request to access the media content includes the entitlements.

4. The method of claim 1, wherein establishing the session comprises one or more of the following:
   associating a security token with the session;
   establishing a session key; and
   negotiating a shared secret.

5. The method of claim 4, wherein determining to grant access to the media content further comprises determining that the security token, the session key, or the shared secret is valid.

6. The method of claim 5, wherein determining to grant access to the media content further comprises evaluating a connection status.

7. The method of claim 5, wherein the license limits a video playback of the media content according to a resolution or ad-insertion policy.

8. The method of claim 1, further comprising:
   receiving, at a content router from the client, a request for routing information, the request for routing information relating to the media content and comprising a third indication of the session security mechanism;
   determining, by the content router based at least in part on the third indication of the session security mechanism, to provide the client with an indication of a storage location; and
   transmitting, from the content router to the client, the indication of the storage location, wherein the storage location of comprises at least a further portion of the media content.

9. The method of claim 8 wherein:
   the indication of the storage location comprises a uniform resource locator, and the request to access the media content comprises the uniform resource locator.

10. A system, comprising a content server, a license server, and an authentication server,
    wherein the content server and the license server are arranged to negotiate, prior to the establishment of a session between the authentication server and a client, a license, the license pertaining to a media content;
    wherein the authentication server is arranged to:
      receive, from the client, a request to establish a session, the request to establish a session specifying a user account;
      authenticate the client based on information relating to the user account;
      establish, with a client, a session, the session having a session security mechanism,
      transmit, to the client, a response to the request to establish a session, the request to establish a session comprising a first indication of the session security mechanism; and
    wherein the content server is further arranged to:
      receive, from the client, a request to access the media content, the request to access the media content comprising a second indication of the session security mechanism;
      determine, based at least in part upon the second indication of the session security mechanism, to grant access to the media content; and
      provide, to the client, a content grant comprising the license, a content key, and a portion of the media content, wherein the content key is embedded in a manifest associated with the media content.

11. The system of claim 10, wherein the content server is further arranged determine to grant access to the media content based at least in part on entitlements, wherein the entitlements are associated with the user account and pertain to accessing media.

12. The system of claim 11, wherein:
    the response to the request to establish the session comprises the entitlements; and
    the request to access media content comprises the entitlements.

13. The system of claim 12, wherein the response to the request to establish the session by includes a security token, a session key, or an acknowledgement of a negotiated a shared secret.

14. The system of claim 13, wherein the content server is further arranged to determine to grant access based, at least in part, on determining a validity of the security token, the session key, or the shared secret.

15. The system of claim 14, wherein the content server is further arranged to determine to grant access based, at least in part, on a connection status.

16. The system of claim 15, wherein the license limits a playback of the media content according to a resolution or ad-insertion policy.

17. The system of claim 16, further comprising a content router, wherein the content router is arranged to:
   receive, from the client, a request for routing information, the request for routing information relating to the media content and comprising the indication of the session security mechanism;
   determine, based on the indication of the session security mechanism, to provide the client with an indication of a storage location; and
   transmitting, from the content router to the client, the indication of the storage location, wherein the storage location comprises at least a further portion of the media content.

18. The system of claim 17, wherein:
   the indication of the storage location comprises a uniform resource locator, and
   the request to access media content comprises the uniform resource locator.

19. A non-transitory computer-readable medium comprising computer executable instructions, that when executed by a processor, cause the processor to perform a method, the method, comprising:
   pre-negotiating, between a content server and a license server, a license, the license pertaining to a media content;
   receiving, by an authentication server from a client, a request to establish a session, the request to establish a session specifying a user account;
   authenticating, by the authentication server, the client based on information relating to the user account;
   establishing, between the authentication server and the client, a session, the session having a session security mechanism;
   transmitting, by the authentication server to the client, a response to the request to establish a session, the response to the request to establish a session comprising a first indication of the session security mechanism;
   receiving, at the content server from the client, a request to access the media content, the request to access the media content comprising a second indication of the session security mechanism;
   determining, by the content server based at least in part upon the second indication of the session security mechanism, to grant access to the media content; and
   providing, by the content server to the client, a content grant comprising a content key, the content key being embedded in a manifest associated with the media content, wherein the content key is consistent with the license.

20. The non-transitory computer-readable medium of claim 19, wherein the method further comprises, determining to grant access to the media content comprises determining entitlements, the entitlements being associated with a user account and pertaining to accessing media.

* * * * *